(12) United States Patent
Liu et al.

(10) Patent No.: US 7,715,216 B2
(45) Date of Patent: May 11, 2010

(54) POWERING CIRCUIT OF AC-DC CONVERTER

(75) Inventors: Hsing-Fu Liu, Hsinchu (TW); Chin Sun, Hsinchu (TW); Chih-Yu Wu, Hsinchu (TW)

(73) Assignee: Macroblock, Inc., Hsinchu (TW)

( * ) Notice: Subject to any disclaimer, the term of this patent is extended or adjusted under 35 U.S.C. 154(b) by 205 days.

(21) Appl. No.: 12/098,512

(22) Filed: Apr. 7, 2008

(65) Prior Publication Data
US 2009/0213629 A1    Aug. 27, 2009

(30) Foreign Application Priority Data
Feb. 22, 2008    (TW) .............................. 97106374 A

(51) Int. Cl.
H02M 7/04    (2006.01)
H02M 7/68    (2006.01)

(52) U.S. Cl. ........................... 363/89; 323/266; 323/274

(58) Field of Classification Search .................. 363/89, 363/125, 126; 323/266, 273, 274, 275
See application file for complete search history.

(56) References Cited

U.S. PATENT DOCUMENTS 3,777,253 A * 12/1973 Callan ......................... 323/284
3,818,273 A * 6/1974 Nakashima et al. ........... 361/59
6,169,391 B1    1/2001 Lei
6,184,669 B1 * 2/2001 Matsuo ........................ 323/303
6,369,997 B2 * 4/2002 Graube ....................... 361/93.9
6,992,467 B1 * 1/2006 Fey ............................. 323/266
7,557,548 B2 * 7/2009 Fey ............................. 323/266
2002/0044471 A1    4/2002 Chen et al.

* cited by examiner

*Primary Examiner*—Bao Q Vu
(74) *Attorney, Agent, or Firm*—Rabin & Berdo, P.C.

(57) ABSTRACT

A powering circuit of an AC-DC converter, for converting a high AC input voltage into a low DC output voltage to provide a load voltage in a stable DC bias range, includes a rectifier, a sensing circuit, a control switching circuit, and a voltage regulating capacitor. The rectifier has a primary side coupled to an AC power supply and a secondary side for outputting a DC power supply. The sensing circuit compares the AC input voltage with a preset reference voltage, and turns on a second switch in the control switching circuit when the AC input voltage is lower than the reference voltage, thereby providing a low DC output voltage. The control switching circuit sustains the DC output voltage in a stable DC bias range. Therefore, in addition to reducing the power consumption of the second switch, this circuit structure is simple and can achieve the purpose of circuit integration.

20 Claims, 12 Drawing Sheets

POWERING CIRCUIT OF AC-DC CONVERTER

CROSS-REFERENCE TO RELATED APPLICATIONS

This non-provisional application claims priority under 35 U.S.C. §119(a) on Patent Application No(s). 097106374 filed in Taiwan, R.O.C. on Feb. 22, 2008, the entire contents of which are hereby incorporated by reference.

BACKGROUND OF THE INVENTION

1. Field of Invention

The present invention relates to a powering circuit of an AC-DC converter, and in particular, to a powering circuit of an AC-DC converter that turns on a switch only when an AC input voltage is lower than a preset reference voltage and sustaining a DC output voltage in a stable DC bias range.

2. Related Art

A conventional AC-DC converter adopts an isolated voltage divider design. In this design, after an AC power supply is coupled to a rectifier, an external transformer converts a high AC power supply into a low-voltage DC power supply for a low-voltage DC power supply device. However, the external transformer has a large volume, which goes against the demands for miniaturization. Then, linear regulators such as low dropout voltage regulator (LDO) are provided to solve the above problem, but the power consumption of switches of the LDO may easily cause unsatisfactory conversion efficiency.

Accordingly, the decrease of the power consumption and the improvement of the conversion efficiency have become major topics in the current miniaturized AC-DC power supply system. An AC-DC converter circuit without the use of a transformer capable of outputting a stable constant current, US Patent Publication No. 2002/0044471, has been put forward by the applicant of the present invention. This AC-DC converter circuit is applicable to a load device such as a light-emitting element (for example, an LED) in need of a stable current supply. According to the technical means, a current switching circuit is used to limit a load current within a stable range. A control circuit is used to determine the on/off state of the current switching circuit according to the potential difference between the output and input of the control circuit. When the potential difference is lower than a preset value, the control circuit switches on the load current, and when the potential difference is higher than a preset value, the control circuit switches off the load current, thereby achieving the effect of limiting the load current.

Further, U.S. Pat. No. 6,169,391 B1 has also disclosed an AC-DC converter circuit without the use of a transformer. A control circuit functioning similarly to a linear regulator is employed to limit the output voltage of a DC power supply. The control circuit has a sensing circuit for detecting an input voltage Vin of an AC power supply, and controls the on/off state of a switch according to the value of the input voltage Vin. The sensing circuit is comprised of two voltage divider resistors connected in series and a zener diode connected in series to the voltage divider resistor. However, such circuit design is obviously complex.

SUMMARY OF THE INVENTION

Accordingly, the present invention is directed to a powering circuit of an AC-DC converter capable of reducing the power consumption of a switch.

In a preferred embodiment of the present invention, the powering circuit includes a rectifier, a sensing circuit, a control switching circuit, and a voltage regulating capacitor. The rectifier has a primary side coupled to an AC power supply, for converting the AC power supply into a DC power supply. The sensing circuit is connected to a secondary side of the rectifier, for detecting an AC input voltage of the AC power supply. When the AC input voltage is lower than a preset reference voltage (Vref), a second switch in the control switching circuit is turned on, thereby providing a low DC output voltage. The control switching circuit sustains the DC output voltage in a stable DC bias range. In other words, according to a preferred embodiment of the present invention, the second switch is turned on only when the AC input voltage is lower than the preset reference voltage, and is turned off when the AC input voltage is higher than a preset voltage. As the potential difference between the input and output in the course of the on state of the second switch is small, the power consumption of the second switch can be reduced.

The present invention is also directed to a powering circuit of an AC-DC converter with a simple circuit structure. According to a preferred embodiment of the present invention, the powering circuit includes a rectifier, a sensing circuit, a control switching circuit, and a voltage regulating capacitor. The sensing circuit has a voltage divider and a first switch. The sensing circuit uses the voltage divider to obtain a divided DC voltage of a DC power supply at a secondary side of the rectifier, and compares the divided DC voltage with a turn-on voltage of the first switch, for turning off the first switch when the divided DC voltage is lower than the turn-on voltage. The second switch is turned on when the DC voltage of the DC power supply at the secondary side of the rectifier is lower than the preset reference voltage, and is turned off when the DC voltage of the DC power supply at the secondary side of the rectifier is higher than the preset reference voltage.

The present invention is further directed to a powering circuit of an AC-DC converter capable of realizing integration. According to a preferred embodiment of the present invention, the first and second switches may be fabricated in a semiconductor process, thus achieving the purpose of circuit integration.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The objectives of the present invention are illustrated in the following embodiments, which are not intended to limit the scope of the present invention.

Figure 1:
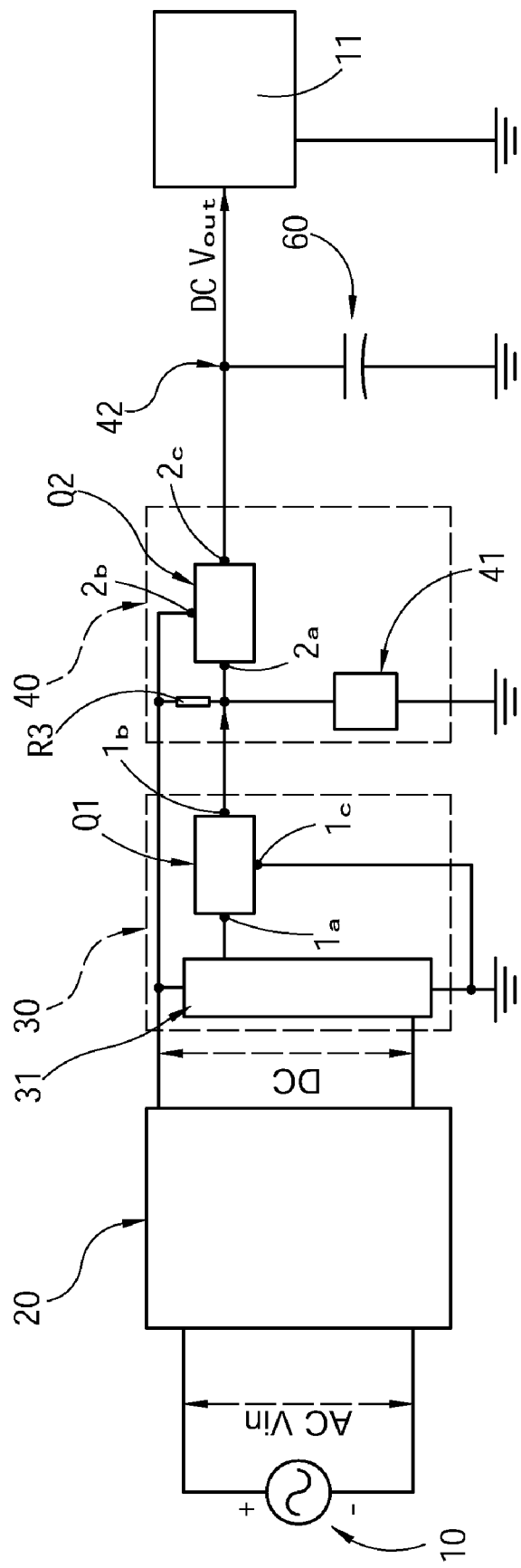
FIG. 1 shows architecture of a powering circuit of an AC-DC converter according to a preferred embodiment of the present invention.

First, referring to FIG. 1, a circuit architecture of a preferred embodiment of the present invention is shown. The circuit architecture is used to convert a high AC input voltage AC Vin of an AC power supply 10 into a low DC output voltage DC Vout. Then, the DC output voltage DC Vout stabilized in a DC bias range is output through a low-voltage DC output end 42, so as to provide a load voltage stabilized in a DC bias range for a low-voltage DC power supply device 11 (for example, an integrated circuit or a miniaturized electronic product). The circuit architecture includes a rectifier 20, a sensing circuit 30, a control switching circuit 40, and a voltage regulating capacitor 60.

The rectifier 20 has a primary side coupled to the AC power supply 10 and a secondary side for outputting a DC power supply DC. The rectifier 20 may be a full-wave bridge rectifier or a half-wave bridge rectifier.

The sensing circuit 30 has a voltage divider 31 and a first switch Q1. The voltage divider 31 is coupled to the secondary side of the rectifier 20 so as to obtain a divided DC voltage of the DC power supply at the secondary side. The first switch Q1 has a control pad 1a, an input pad 1b, and an output pad 1c. The output pad 1c is connected to ground potential, and the control pad 1a is connected to the voltage divider 31. Thus, the sensing circuit 30 compares the divided DC voltage with a turn-on voltage of the first switch Q1, for turning off the first switch Q1 when the divided DC voltage is lower than the turn-on voltage.

The control switching circuit 40 has a third resistor R3, a second switch Q2, and a first voltage regulating element 41 (for example, but not limited to, a zener diode). The second switch Q2 has a control pad 2a, an input pad 2b, and an output pad 2c. The input pad 2b of the second switch Q2 is connected to the secondary side of the rectifier 20, and the control pad 2a is connected to the input pad 1b of the first switch Q1. Thus, when the DC voltage of the DC power supply at the secondary side of the rectifier 20 is lower than a preset reference voltage Vref, the second switch Q2 is turned on to send the DC power supply at the secondary side of the rectifier 20 to the DC output end 42 of the control switching circuit 40 through the output pad 2c, thereby outputting a DC output voltage DC Vout. The voltage level of the DC output voltage DC Vout is clamped by the first voltage regulating element 41, and is lower than a clamping voltage level of the first voltage regulating element 41.

The voltage regulating capacitor 60 is connected at one end to the DC output end 42 of the control switching circuit 40 and at the other end to ground potential, so as to provide a DC output voltage DC Vout stabilized in a DC bias range and serving as a load voltage required by the low-voltage DC power supply device 11.

According to the circuit architecture in FIG. 1, the present invention further provides several specific embodiments of the circuit as follows.

Figure 2A:
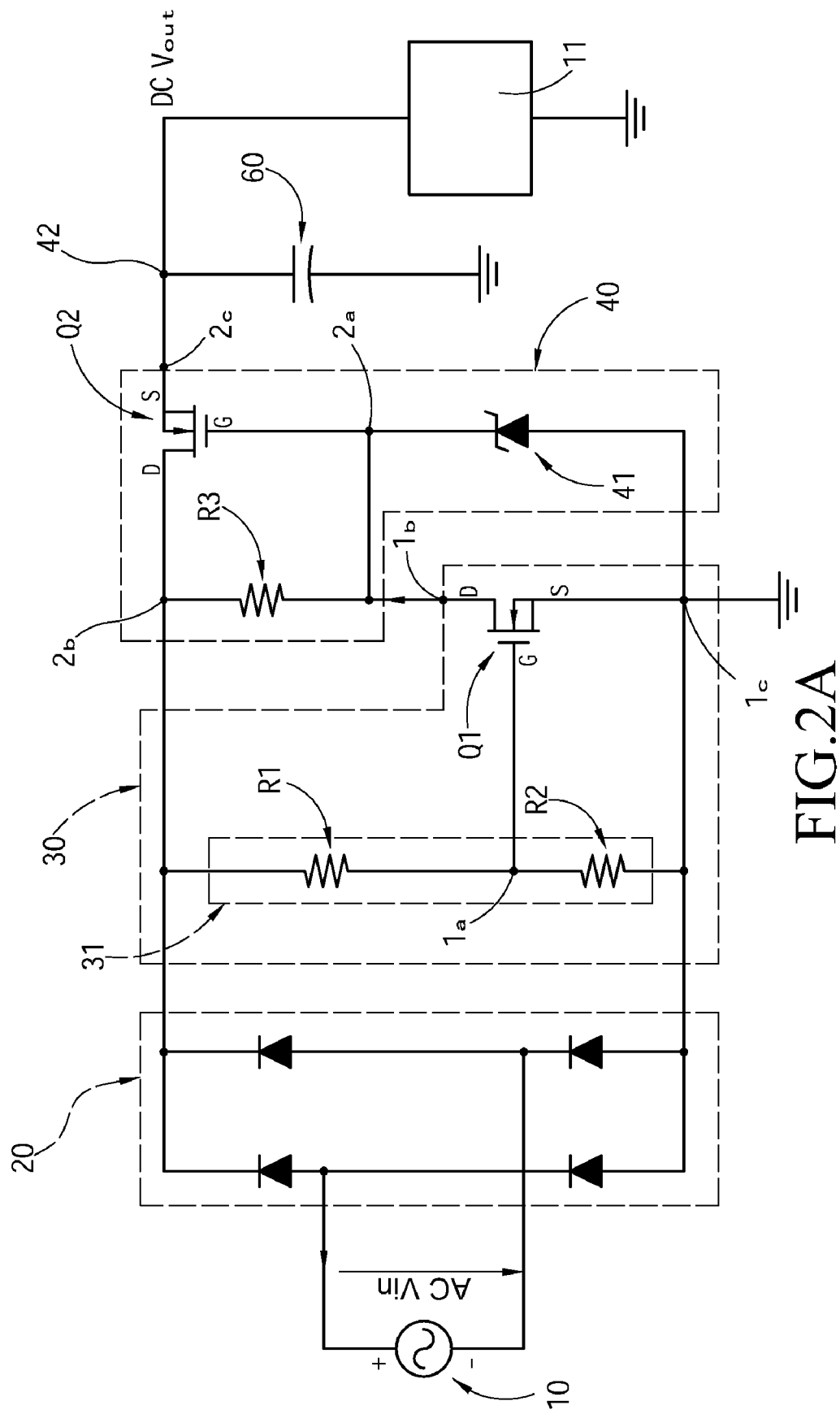
FIG. 2A shows a configuration of a powering circuit of an AC-DC converter according to a preferred embodiment of the present invention (using a full-wave bridge rectifier)
Figure 2B:
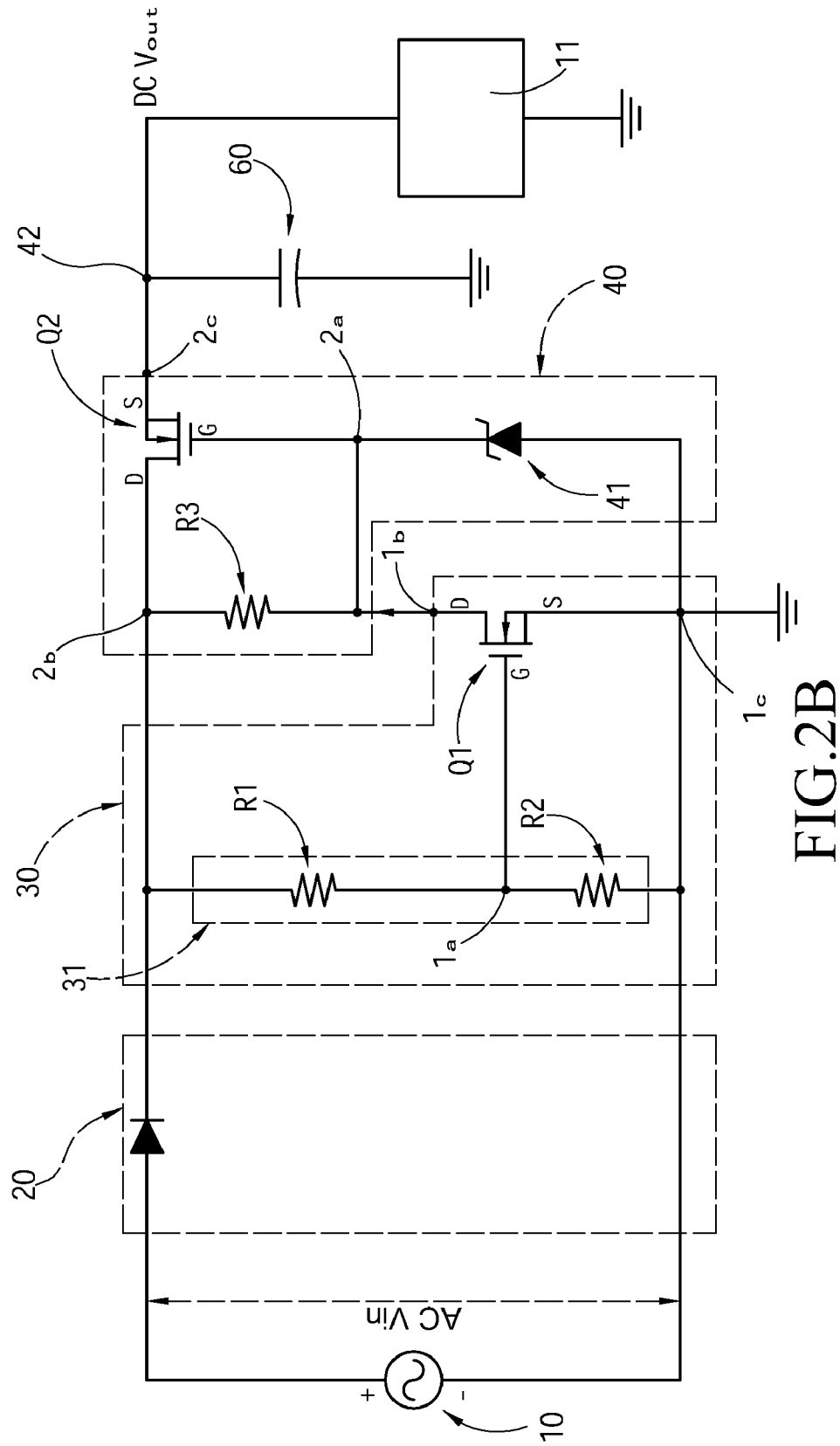
FIG. 2B shows a configuration of a powering circuit of an AC-DC converter according to a preferred embodiment of the present invention (using a half-wave bridge rectifier)

FIGS. 2A and 2B show a first specific embodiment of the circuit. The rectifier 20 is a full-wave bridge rectifier in FIG. 2A, and a half-wave bridge rectifier in FIG. 2B. For example, in FIG. 2A, the first switch Q1 and the second switch Q2 are power metal oxide semiconductor field effect transistors (MOSFET), and preferably, N-MOSFETs. Since N-MOSFETs can be fabricated in a semiconductor process, the powering circuit of an AC-DC converter of the present invention can also be fabricated in the semiconductor process, thereby achieving the purpose of integration. The voltage divider 31 includes a first resistor R1 and a second resistor R2 connected in series to the first resistor R1. The first resistor R1 is connected at one end to the secondary side of the rectifier 20, and at the other end to the second resistor R2 and a gate G of the first switch Q1. The second resistor R2 is connected at one end to the first resistor R1 and the gate of the first switch Q1, and the other end of the second resistor R2 and a source S of the first switch Q1 are both connected to ground potential. In brief, the sensing circuit 30 determines the on/off state of the second switch Q2 according to the value of the AC input voltage AC Vin. Generally speaking, the withstand voltage of the first switch Q1 must be higher than the divided DC voltage of the first resistor R1 and the second resistor R2.

In FIG. 2A, the control switching circuit 40 has a third resistor R3. The third resistor R3 is connected at one end to the secondary side of the rectifier 20, and at the other end to a drain D of the first switch Q1 and a cathode of the first voltage regulating element 41, so as to prevent the first voltage regulating element 41 of the control switching circuit 40 from being damaged by an over-high current. The first voltage regulating element 41 has an anode connected to ground potential. The second switch Q2 has a gate G connected to the drain of the first switch Q1 and the cathode of the first voltage regulating element 41, a drain D connected to the secondary side of the rectifier 20, and a source S connected to the DC output end 42.

According to the circuit operation in FIG. 2A, when the divided DC voltage is higher than the turn-on voltage of the first switch Q1, the gate-source of the first switch Q1 generates a forward bias to make the first switch Q1 assume an on state, i.e., turn on the first switch Q1. At this time, the first voltage regulating element 41 is at a low level, and the second switch Q2 cannot be turned on, and the DC power supply DC at the secondary side of the rectifier 20 will not be provided to the DC output end 42. On the contrary, when the divided DC voltage is lower than the turn-on voltage of the first switch Q1, the first switch Q1 is turned off, and the voltage level of the first voltage regulating element 41 with a voltage clamp function will rise increasingly. Moreover, when the DC voltage of the DC power supply at the secondary side of the rectifier 20 is lower than the preset reference voltage Vref, the second switch Q2 is turned on, and the DC output end 42 outputs a low DC output voltage DC Vout. The voltage level of the DC output voltage DC Vout may also be clamped by the first voltage regulating element 41 to be lower than the clamping voltage level of the first voltage regulating element 41.

Figure 3A:
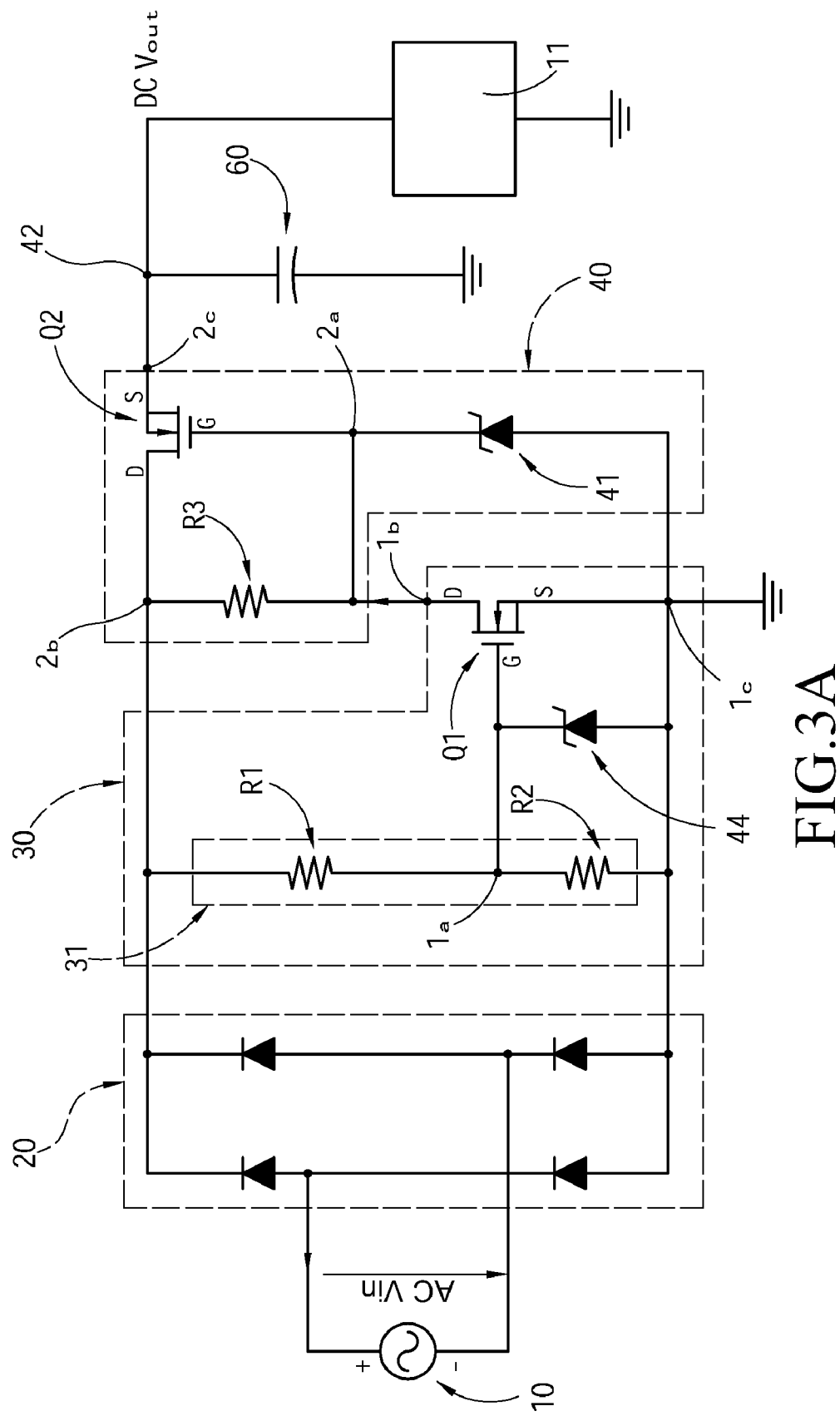
FIG. 3A shows a configuration of a powering circuit of an AC-DC converter according to a preferred embodiment of the present invention (using a full-wave bridge rectifier)
Figure 3B:
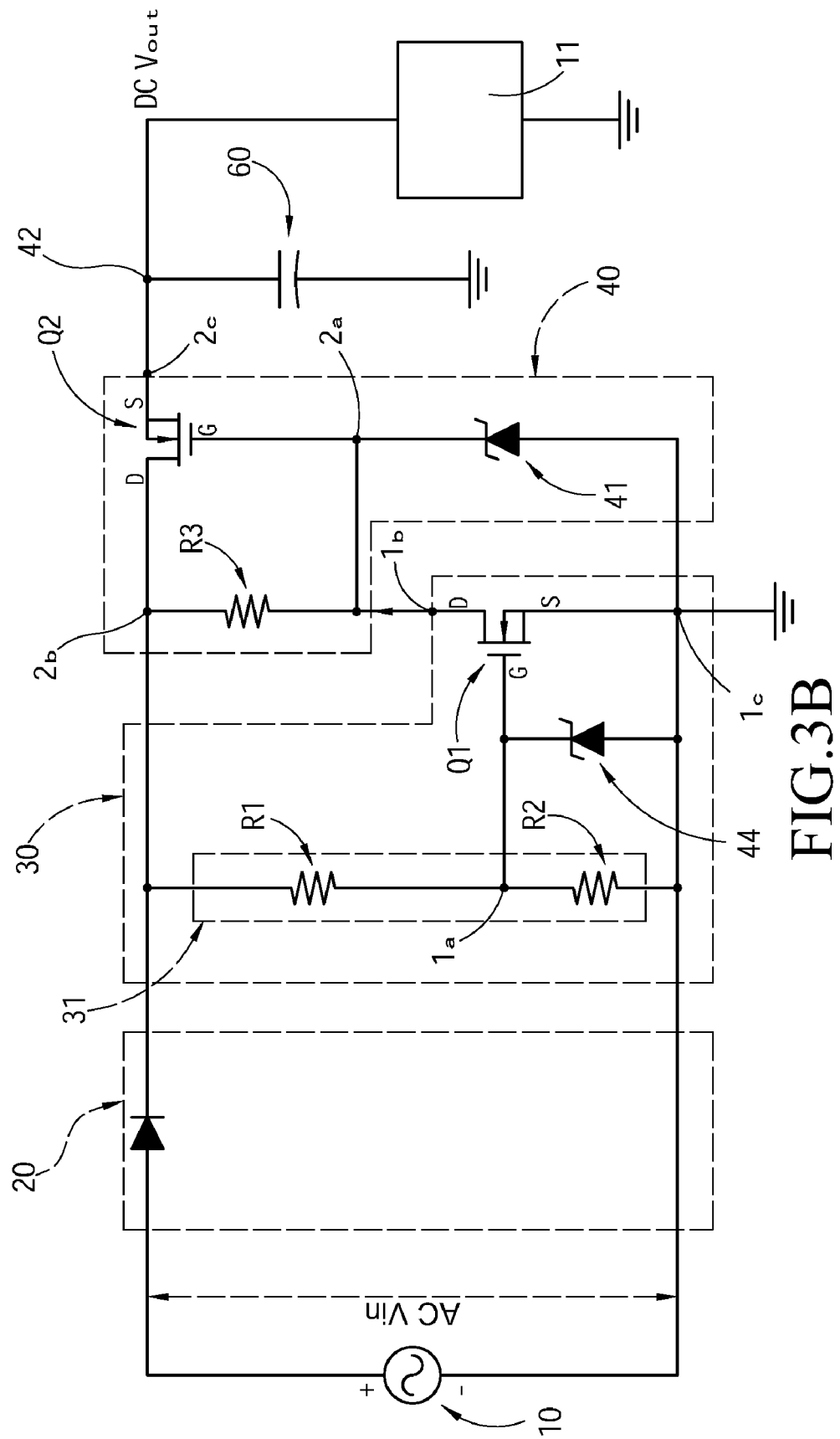
FIG. 3B shows a configuration of a powering circuit of an AC-DC converter according to a preferred embodiment of the present invention (using a half-wave bridge rectifier)

FIGS. 3A and 3B respectively show another embodiment of FIGS. 2A and 2B. The embodiment of FIG. 3A further includes a second voltage regulating element 44 (for example, but not limited to, a zener diode). The second voltage regulating element 44 has a cathode connected to the gate G of the first switch Q1, and an anode connected to ground potential. Through the voltage clamp function of the second voltage regulating element 44, the voltage level between the gate and the source of the first switch Q1 is clamped, so as to prevent the first switch Q1 from being damaged by an over-high AC input voltage.

Figure 4A:
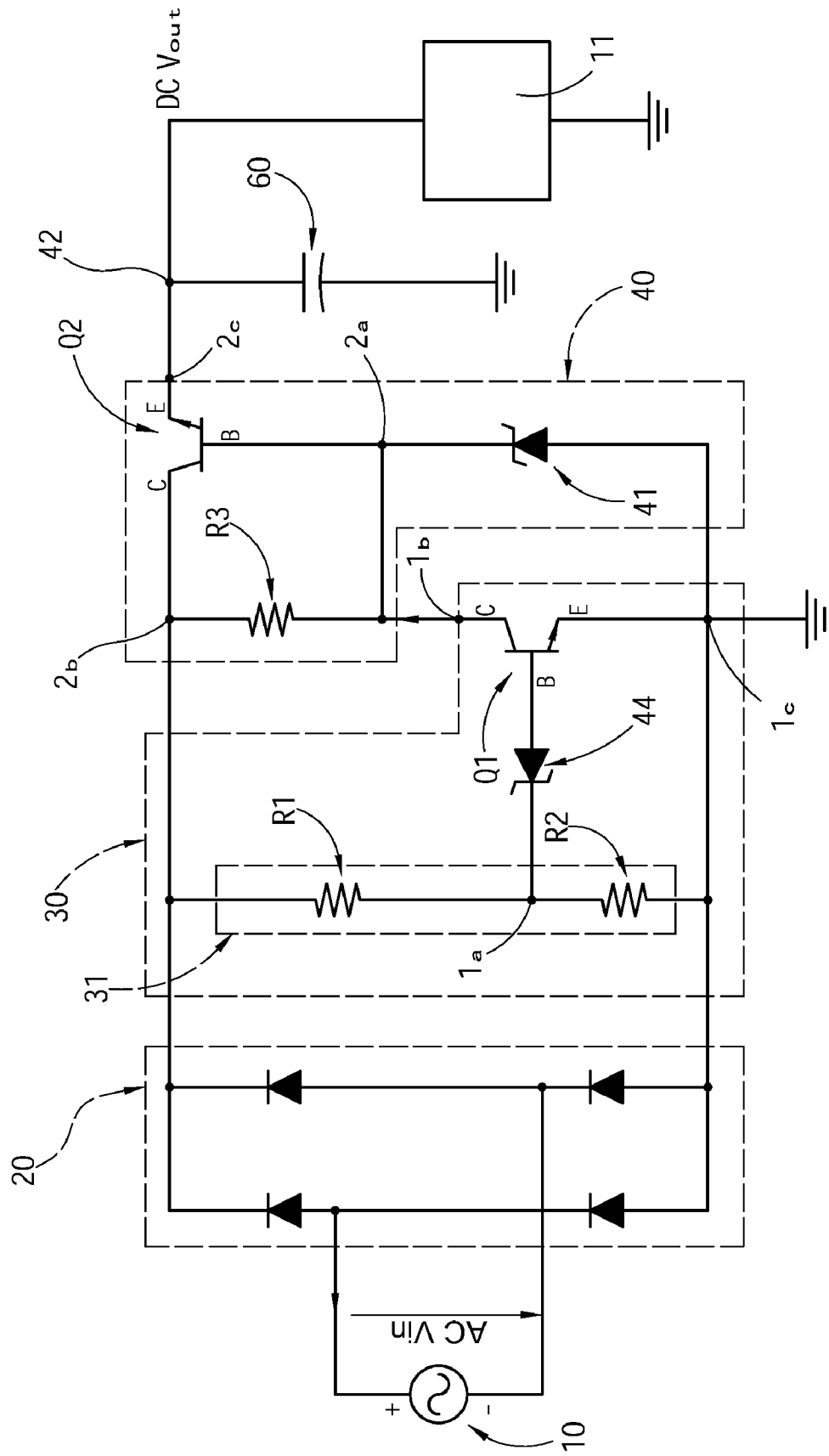
FIG. 4A shows a configuration of a powering circuit of an AC-DC converter according to a preferred embodiment of the present invention (using a full-wave bridge rectifier)
Figure 4B:
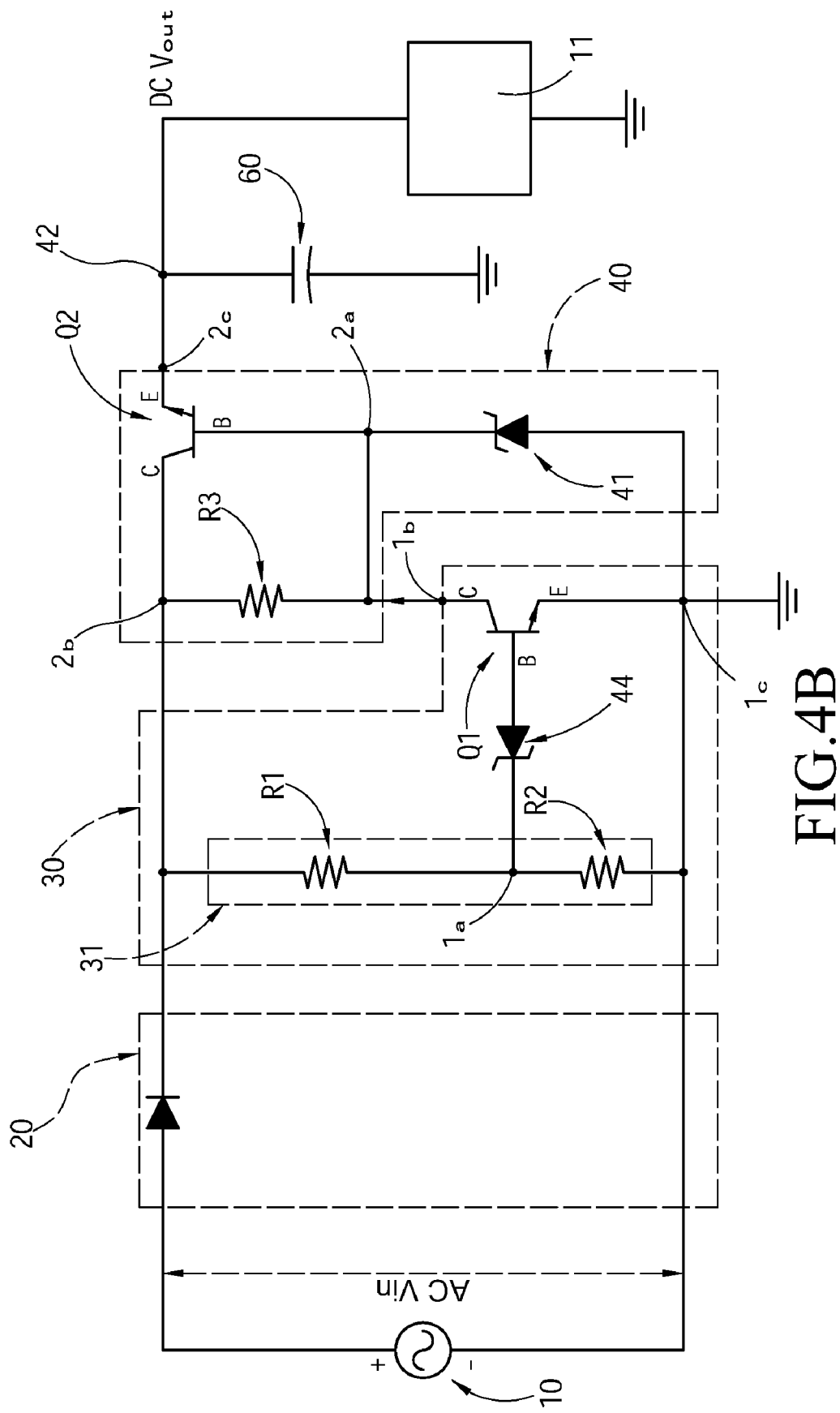
FIG. 4B shows a configuration of a powering circuit of an AC-DC converter according to a preferred embodiment of the present invention (using a half-wave bridge rectifier)

FIGS. 4A and 4B respectively show another embodiment of FIGS. 3A and 3B. In FIG. 4A, the first switch Q1 and the second switch Q2 are both bi-polar junction transistors (BJTs), and the second voltage regulating element 44 is connected in series between the voltage divider 31 and a base of the first switch Q1 (BJT), so as to protect the first switch Q1 from being damaged by an over-high AC input voltage.

Figure 5A:
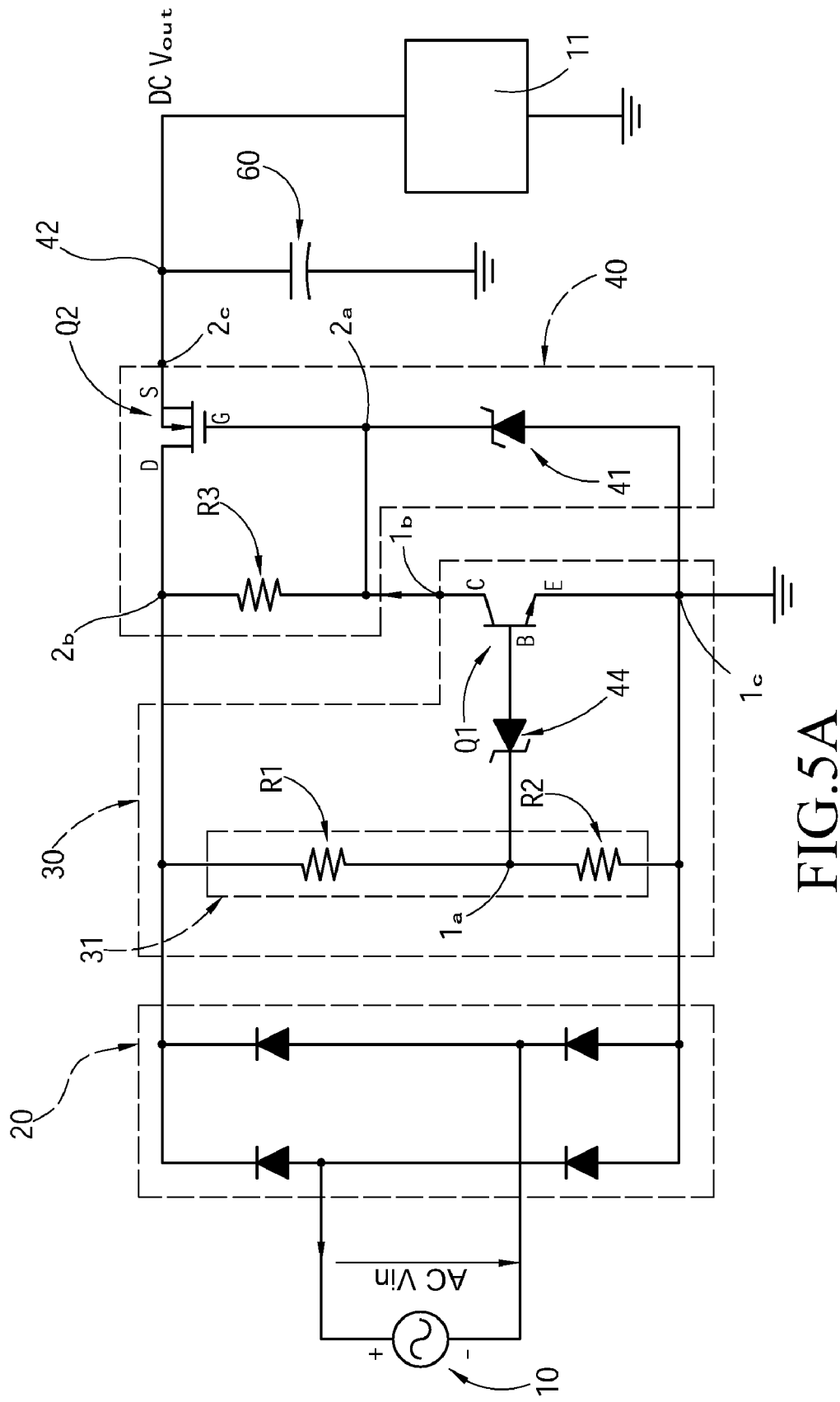
FIG. 5A shows a configuration of a preferred embodiment of FIG. 4A (using a full-wave bridge rectifier)
Figure 5B:
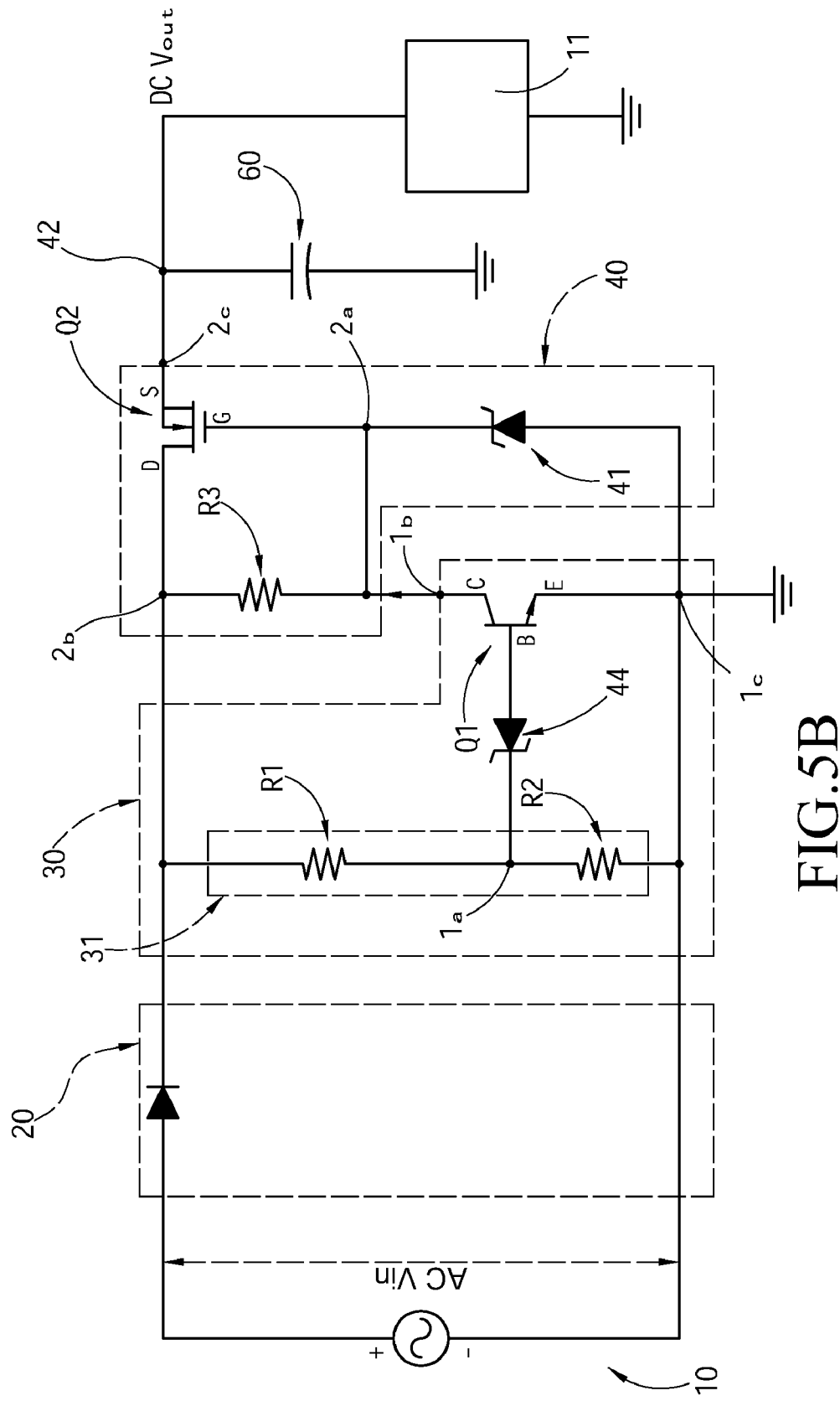
FIG. 5B shows a configuration of a preferred embodiment of FIG. 4B (using a half-wave bridge rectifier)

In another preferred embodiment of the present invention, the second switch Q2 in FIGS. 4A and 4B is an N-MOSFET having a circuit as shown in FIGS. 5A and 5B respectively.

Figure 6A:
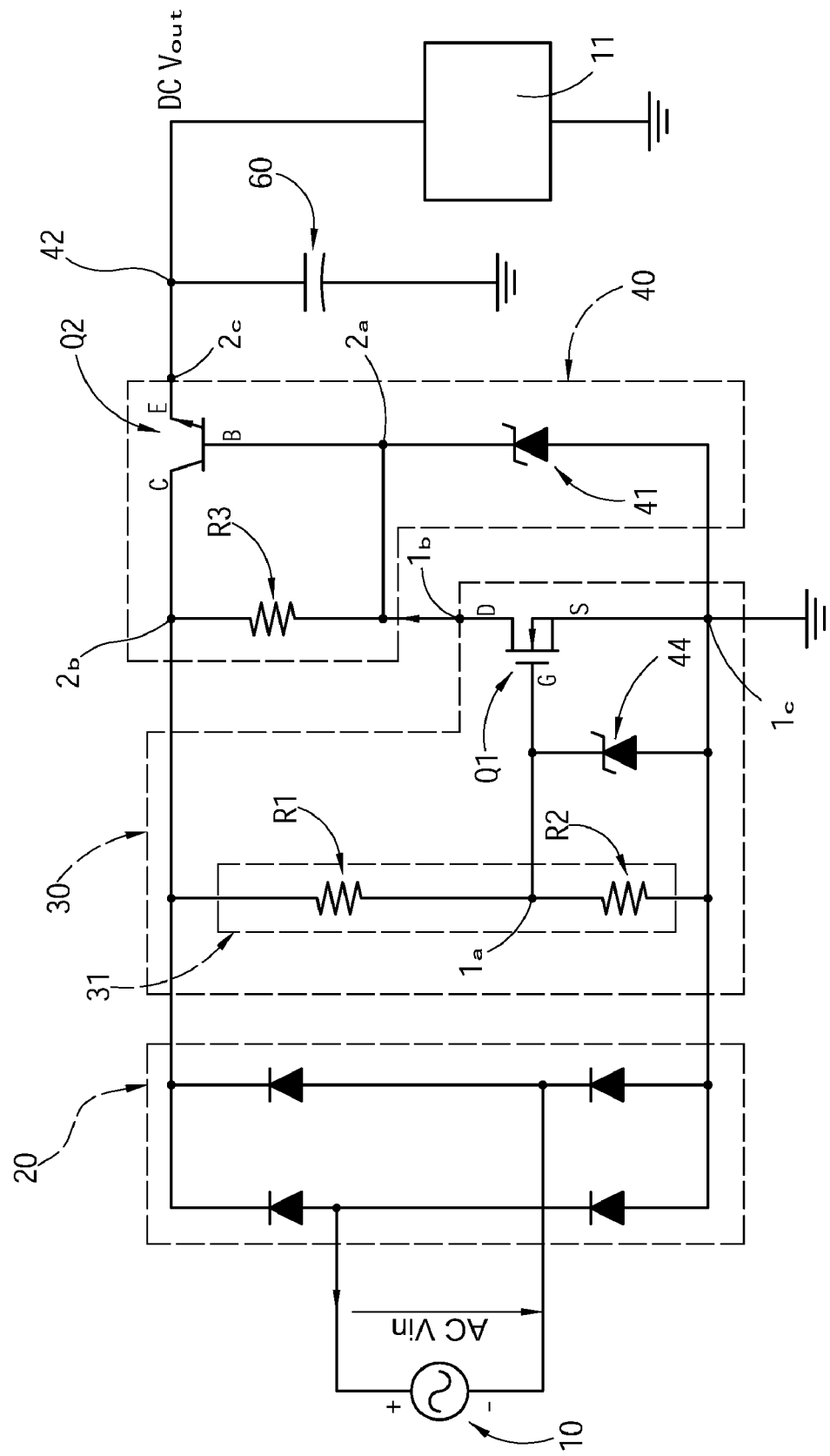
FIG. 6A shows a configuration of a preferred embodiment of FIG. 3A (using a full-wave bridge rectifier)
Figure 6B:
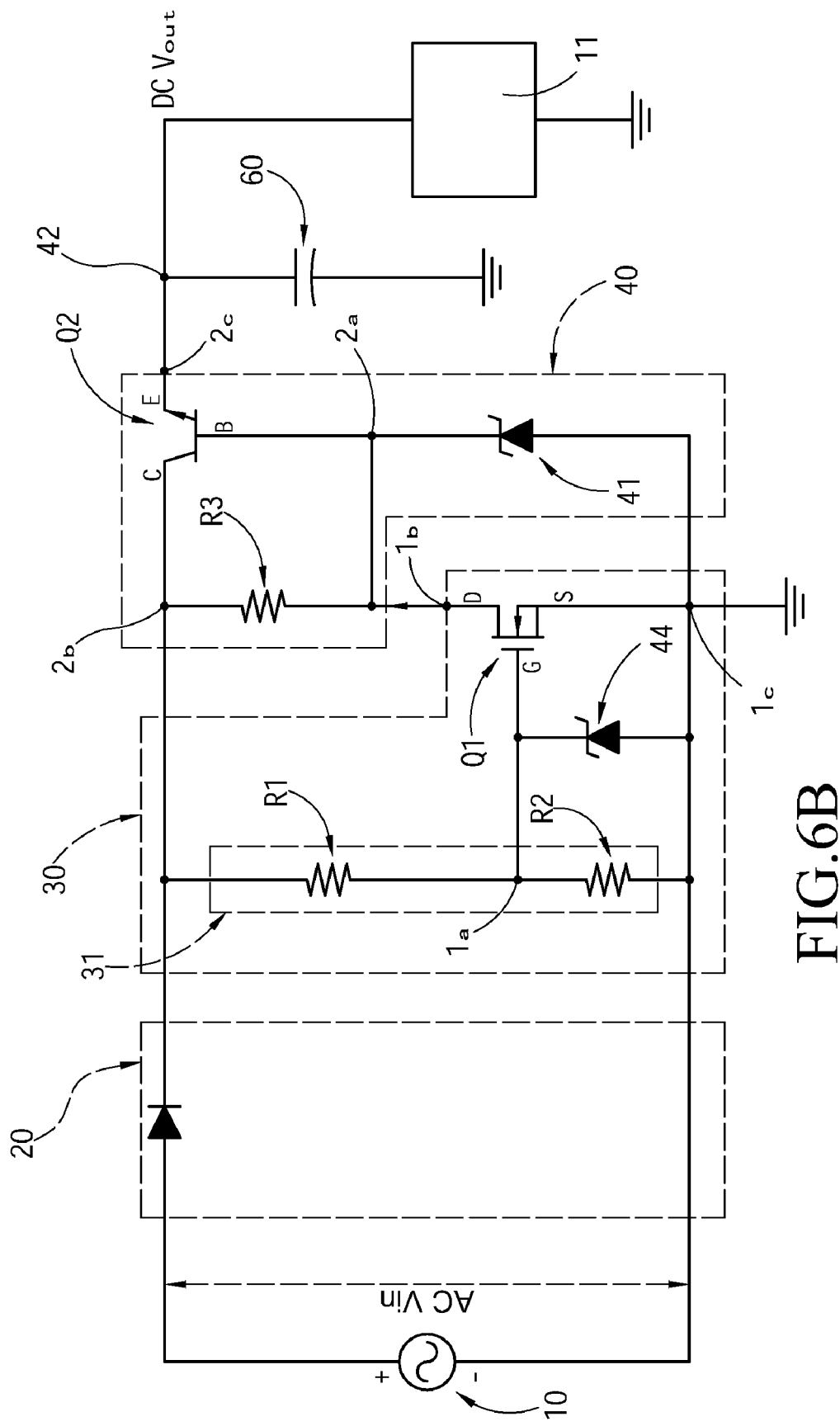
FIG. 6B shows a configuration of a preferred embodiment of FIG. 3B (using a half-wave bridge rectifier)

In another preferred embodiment of the present invention, the second switch Q2 in FIGS. 3A and 3B is a BJT having a circuit as shown in FIGS. 6A and 6B respectively.

Figure 7:
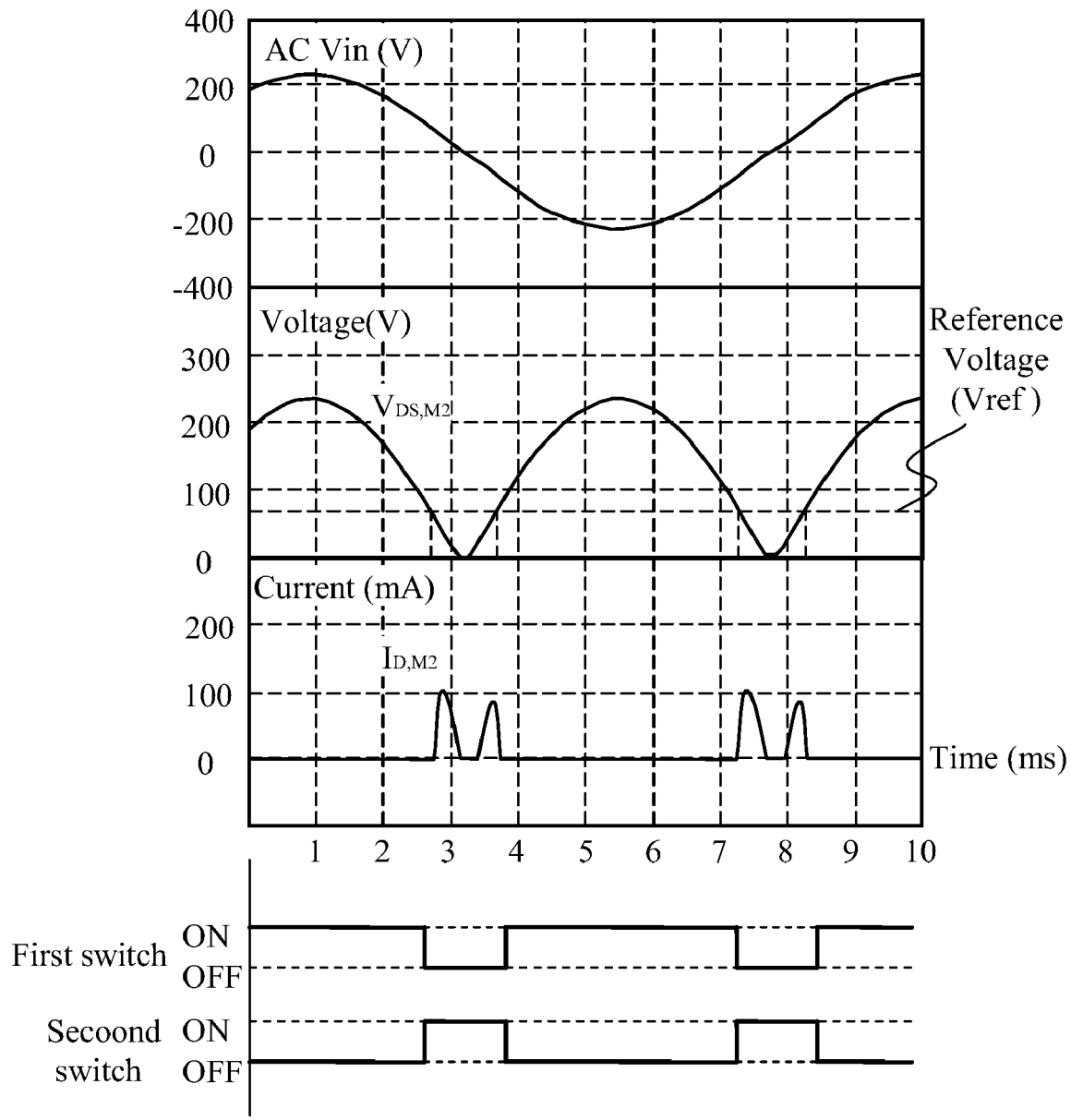
FIG. 7 shows a voltage-current relationship between an AC input voltage AC Vin and a DC output end, and an operation relationship between the first switch and the second switch.

The powering circuit of an AC-DC converter of the present invention is directly adapted to a common commercial power voltage (for example, 110-10 VAC or 220-240 VAC at a frequency of 50-60 Hz), for converting a high AC input voltage AC Vin into a low DC output voltage DC Vout. The reference voltage Vref of a reference power supply serves as a preset voltage for determining the on state (turn on)/off state (turn off) of the second switch Q2. The reference voltage Vref=the turn-on voltage of the first switch Q1×(R1+R2)/R2. The voltage-current relationship between the AC input voltage AC Vin and the DC output end 42 is indicated by the curve of FIG. 7 (in which the circuit using a full-wave bridge rectifier 20 in FIG. 2A is taken as an example for illustration). In FIG. 7, the voltage V is a drain-source voltage Vds of the second switch Q2, and the reference voltage Vref is, for example, 70 DC V. When the divided DC voltage is higher than the turn-on voltage of the first switch Q1, the first switch Q1 is turned on, the second switch Q2 is turned off. At the same time, a drain current $I_D$ of the second switch Q2 is 0. When the divided DC voltage is lower than the turn-on voltage of the first switch Q1, the first switch Q1 is turned off. At the same time, the voltage drop at two ends of the first voltage regulating element 41 increasingly rises to a clamping voltage of the first voltage regulating element 41. Meanwhile, when the DC voltage of the DC power supply at the secondary side of the rectifier 20 is lower than the preset reference voltage Vref, the second switch Q2 is turned on, and the DC output end 42 outputs a low DC output voltage DC Vout. The voltage level of the DC output voltage DC Vout may also be clamped by the first voltage regulating element 41 to be lower than the clamping voltage level of the first voltage regulating element 41. Thus, the DC output voltage DC Vout of the DC output end 42 is sustained in a stable DC bias range.

In view of the above descriptions, apparently, the powering circuit of an AC-DC converter of the present invention turns on the second switch Q2 only when the AC input voltage AC Vin is lower than the preset reference voltage Vref, and turns off the second switch Q2 when the AC input voltage AC Vin is higher than the preset reference voltage Vref. The advantage of the present invention resides in that when the second switch Q2 is in the on state (turned on), the potential difference between the input and output is low, thus reducing the power consumption of the switch. On the other hand, when the second switch Q2 is in the on state (turned on), the voltage level of the DC output voltage DC Vout is clamped by the first voltage regulating element 41 to be lower than the clamping voltage level of the first voltage regulating element 41. Thus, the DC output voltage DC Vout is sustained in a stable DC bias range.

What is claimed is:

1. A powering circuit of an AC-DC converter, for converting a AC input voltage from an AC power supply into a DC output voltage, comprising:
    a rectifier, having a primary side coupled to the AC power supply and a secondary side for outputting a DC power supply;
    a sensing circuit, having a voltage divider and a first switch, wherein the first switch comprises a control pad, an input pad, and an output pad, the output pad is connected to ground potential, the voltage divider is coupled to the secondary side of the rectifier so as to obtain a divided DC voltage of the DC power supply at the secondary side and connect the divided DC voltage to the control pad of the first switch, for turning off the first switch when the divided DC voltage is lower than a turn-on voltage of the first switch;
    a control switching circuit, having a third resistor, a first zener diode, and a second switch, wherein the second switch has a control pad, an input pad, and an output pad, the third resistor is connected at one end to the secondary side of the rectifier and at the other end to the input pad of the first switch and a cathode of the first zener diode, an anode of the first zener diode is connected to ground potential, the control pad of the second switch is connected to the input pad of the first switch and the cathode of the first zener diode, the input pad of the second switch is connected to the secondary side of the rectifier, and the output pad of the second switch is connected to a DC output end, for turning on the second switch when the DC voltage of the DC power supply at the secondary side of the rectifier is lower than a preset reference voltage, and turning off the second switch when the DC voltage of the DC power supply at the secondary side of the rectifier is higher than the preset reference voltage; and
    a voltage regulating capacitor, being connected at one end to the output pad of the second switch and the other end to ground potential.

2. The powering circuit of an AC-DC converter according to claim 1, wherein the rectifier is a full-wave bridge rectifier.

3. The powering circuit of an AC-DC converter according to claim 1, wherein the rectifier is a half-wave bridge rectifier.

4. The powering circuit of an AC-DC converter according to claim 1, wherein the voltage divider comprises a first resistor and a second resistor connected in series to the first resistor, the first resistor is connected at one end to the secondary side of the rectifier and at the other end to the second resistor and the control pad of the first switch, and the second resistor is connected at one end to the first resistor and the control pad of the first switch and at the other end to ground potential.

5. The powering circuit of an AC-DC converter according to claim 4, wherein the first switch and the second switch are N-type metal oxide semiconductor field effect transistors (N-MOSFET).

6. The powering circuit of an AC-DC converter according to claim 1, further comprising a second zener diode, wherein the second zener diode has a cathode connected to the control pad of the first switch and an anode connected to ground potential, for clamping a voltage level of the first switch.

7. The powering circuit of an AC-DC converter according to claim 6, wherein the first switch is an N-MOSFET, and the second switch is a bi-polar junction transistor (BJT).

8. The powering circuit of an AC-DC converter according to claim 1, wherein the first switch and the second switch are BJTs.

9. The powering circuit of an AC-DC converter according to claim 8, further comprising a second voltage regulating element disposed between the first switch and the voltage divider, for protecting the first switch from being damaged by an over-high AC input voltage.

10. The powering circuit of an AC-DC converter according to claim 1, wherein the first switch is a BJT, the second switch is an N-MOSFET, and a second voltage regulating element is further disposed between the first switch and the voltage divider, for protecting the first switch from being damaged by an over-high AC input voltage.

11. An integrated powering circuit of an AC-DC converter fabricated in a semiconductor process, capable of converting a AC input voltage from an AC power supply into a DC output voltage, comprising:
  a rectifier, having a primary side coupled to the AC power supply and a secondary side for outputting a DC power supply;
  a sensing circuit, having a voltage divider and a first switch, wherein the first switch comprises a control pad, an input pad, and an output pad, the output pad is connected to ground potential, the voltage divider is coupled to the secondary side of the rectifier so as to obtain a divided DC voltage of the DC power supply at the secondary side and connect the divided DC voltage to the control pad of the first switch, for turning off the first switch when the divided DC voltage is lower than a turn-on voltage of the first switch;
  a control switching circuit, having a third resistor, a first zener diode, and a second switch, wherein the second switch has a control pad, an input pad, and an output pad, the third resistor is connected at one end to the secondary side of the rectifier and at the other end to the input pad of the first switch and a cathode of the first zener diode, an anode of the first zener diode is connected to ground potential, the control pad of the second switch is connected to the input pad of the first switch and the cathode of the first zener diode, the input pad of the second switch is connected to the secondary side of the rectifier, and the output pad of the second switch is connected to a DC output end, for turning on the second switch when the DC voltage of the DC power supply at the secondary side of the rectifier is lower than a preset reference voltage, and turning off the second switch when the DC voltage of the DC power supply at the secondary side of the rectifier is higher than the preset reference voltage; and
  a voltage regulating capacitor, being connected at one end to the output pad of the second switch and at the other end to ground potential.

12. The powering circuit of an AC-DC converter according to claim 11, wherein the rectifier is a full-wave bridge rectifier.

13. The powering circuit of an AC-DC converter according to claim 11, wherein the rectifier is a half-wave bridge rectifier.

14. The powering circuit of an AC-DC converter according to claim 11, wherein the voltage divider comprises a first resistor and a second resistor connected in series to the first resistor, the first resistor is connected at one end to the secondary side of the rectifier, and at the other end to the second resistor and the control pad of the first switch, while the second resistor is connected at one end to the first resistor and the control pad of the first switch and at the other end to ground potential.

15. The powering circuit of an AC-DC converter according to claim 14, wherein the first switch and the second switch are N-MOSFETs.

16. The powering circuit of an AC-DC converter according to claim 11, further comprising a second zener diode, wherein the second zener diode has a cathode connected to the control pad of the first switch and an anode connected to ground potential, for clamping a voltage level of the first switch.

17. The powering circuit of an AC-DC converter according to claim 16, wherein the first switch is an N-MOSFET, and the second switch is a BJT.

18. The powering circuit of an AC-DC converter according to claim 11, wherein the first switch and the second switch are BJTs.

19. The powering circuit of an AC-DC converter according to claim 18, further comprising a second voltage regulating element disposed between the first switch and the voltage divider, for protecting the first switch from being damaged by an over-high AC input voltage.

20. The powering circuit of an AC-DC converter according to claim 11, wherein the first switch is a BJT, the second switch is an N-MOSFET, and a second voltage regulating element is further disposed between the first switch and the voltage divider, for protecting the first switch from being damaged by an over-high AC input voltage.

* * * * *